March 11, 1924.
O. B. OLSON
1,486,296
SEAT COVER FOR AUTOMOBILES
Filed July 23, 1923
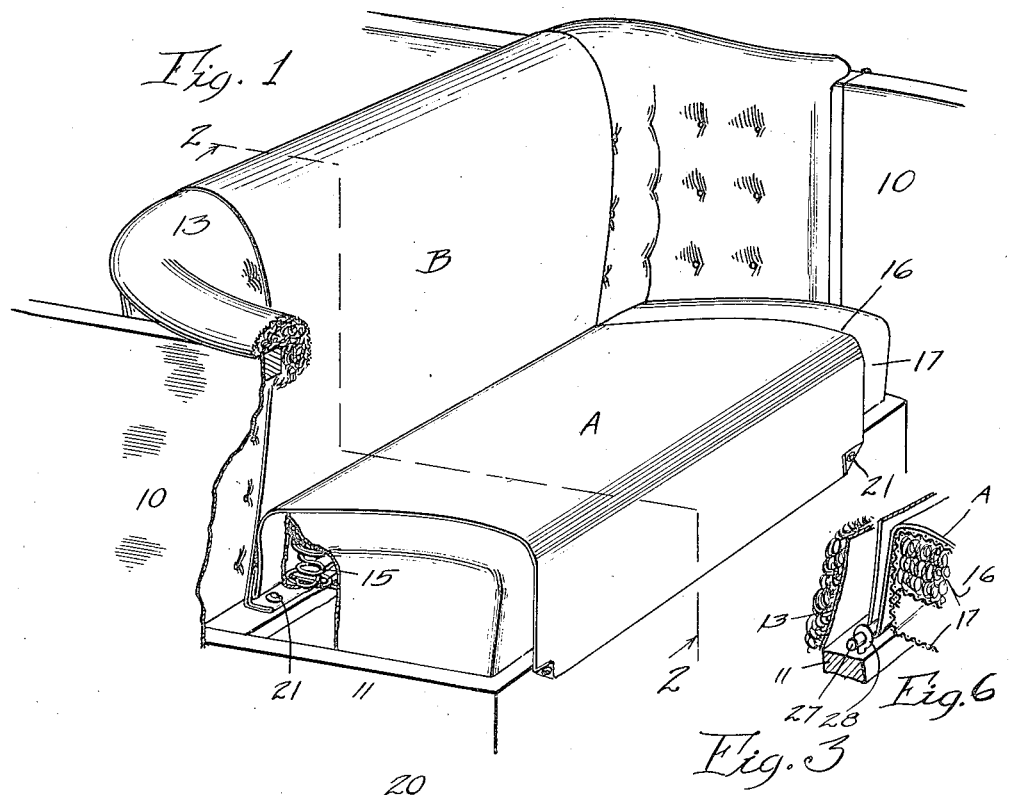
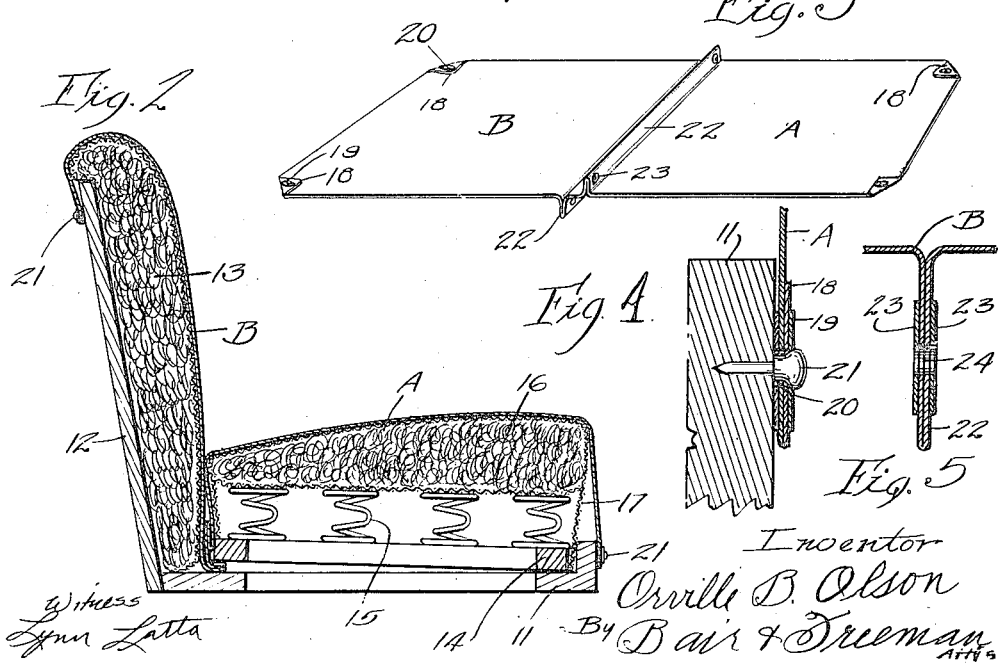

Patented Mar. 11, 1924.

1,486,296

UNITED STATES PATENT OFFICE.

ORVILLE B. OLSON, OF WEBSTER CITY, IOWA.

SEAT COVER FOR AUTOMOBILES.

Application filed July 23, 1923. Serial No. 653,170.

*To all whom it may concern:*

Be it known that I, ORVILLE B. OLSON, a citizen of the United States, and a resident of Webster City, in the county of Hamilton and State of Iowa, have invented a certain new and useful Seat Cover for Automobiles, of which the following is a specification.

The object of my invention is to provide an automobile seat cover of simple, durable and comparatively inexpensive construction.

More particularly, my invention relates to a changeable and reversible auxiliary seat cover for automobiles. In this connection, it may be mentioned that in hot weather the driver of an automobile ordinarily wears light-colored clothing and, due to heat and perspiration, the clothing becomes soiled from coming in contact with the leather upholstering ordinarily used in automobile construction, and it is my object to provide a seat cover which can be quickly installed to overcome the objection heretofore mentioned.

Still a further object is to provide a tough sheet of paper, which may have some waterproofing therein, which sheet can be reversed from end to end and turned upside down so that both sides of the sheet may be utilized before it is necessary to discard the same.

Still a further object is to provide novel means for fastening the sheet of material, which serves as a cover to the automobile.

Still a further object is to provide a pair of intermediate flaps on the seat wherein the back portion of the cover at one time may be utilized for the seat cover at another time.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of an automobile seat with my improved seat cover thereon, parts being broken away and shown in section to better illustrate the construction.

Figure 2 is a central, sectional view taken on line 2—2 of Figure 1.

Figure 3 is a plan, perspective view of the seat cover.

Figure 4 is a detail, sectional view, showing the means for fastening the ends of the seat cover in position; and Figure 5 is a detail, sectional view taken through one of the intermediate flaps of the seat cover.

Figure 6 is a detail view of a modified form of my device.

In the accompanying drawings, I have used the reference numeral 10 to indicate generally an automobile body, which is provided with a seat retaining frame 11 and a back wall 12 of a seat.

Upholstering 13 is placed on one side of the wall 12, as clearly shown in Figure 2 of the drawings. The upholstering 13 may properly be termed the back of the seat.

A seat A is provided, which has a frame 14 designed to be received in the seat retaining frame 11. Coil springs 15 and packing 16 is arranged upon the frame 14 and together with the leather covering 17 form a complete seat.

The parts just described are of the ordinary construction.

My auxiliary seat cover comprises a sheet of material B, clearly shown in Figure 3 of the drawings.

The sheet B is preferably formed of paper, which is tough and may be waterproof.

The sheet A is rectangular in outline and has its corners turned over, as at 18, in order to provide a double thickness of material. On each side of the sheet where the corners are turned over, I secure a pair of paper disks 19. The paper disks 19 and the sheet B are provided with registering openings 20, as clearly shown in Figure 4 of the drawings.

The turning over of the corners 18 and the providing of the disks 19, which may be glued to the sheet B, gives me a very durable structure.

The automobile back wall 12 is provided with a pair of studs 21, which are designed to have the corners of the sheet B extended thereover, as shown in Figure 4 of the drawings.

The studs 21 are provided with enlarged ends and are slightly larger than the diameter of the openings 20 so that when the sheet B is forced over the studs 21, it will remain in position.

The front edge of the seat retaining frame 11 is also provided with the studs 21. Studs 21 are also secured in position on the seat retaining frame directly back of the seat A and near the bottom of the upholstering 13.

The studs 21 just described are designed to receive intermediate flaps formed on the sheet B which I will now describe.

The sheet B is formed with a pair of intermediate flaps 22, which are spaced slightly from each other and project in opposite directions.

The flaps 22 are formed by doubling the material of the sheet B and may be glued together for forming the complete flap.

Disks 23 are placed on each side of the flaps 22 near the ends thereof. The disks 23 and the material adjacent the disks 23 are formed with openings 24, which receive the studs 21 arranged on the seat retaining frame 11 near the back and bottom of the seat A.

The purpose of providing the two intermediate flaps 22 and having them arranged in opposite directions is to permit the sheet B to be turned end for end and upside down, wherein the cover sheet B may be utilized on both sides.

One of the flaps 22 merely remains idle when the parts are in operative position, as shown in Figures 1 and 2 of the drawings. The idle flap, however, is utilized when the sheet is turned upside down and end for end. The flaps 22 are arranged equidistant from the ends which permits the reversing of the sheet.

In this connection, it may be mentioned that the portion of the sheet B, which rests upon the seat A at one time will, when the sheet is reversed, rest against the upholstering 13, while the portion against the upholstering 13 will then rest upon the seat A.

The studs 21 may be so spaced and positioned as to permit the seat cover B to be turned upside down and end for end.

In Figure 6, I have shown a modified form of my invention, in which the cover is held in place at its center by means of a rod 27 around which the cover is passed. The rod 27 is held in place on the seat base 11 by the screw eyes 28, which are screwed into the seat frame. The rod may be removed by sliding it longitudinally until it is freed of the eye at one end, and then slid in the opposite direction.

It will be seen that my seat cover can be cheaply constructed so that when it is soiled, it may be discarded and a new one substituted.

It is my intention to cover by my claims, any modified forms of seat covers, which may be reasonably included within their scope.

I claim as my invention:

1. An automobile seat cover comprising a rectangular sheet of material having eyelets formed in its corners, a pair if intermediate flaps formed on said sheet of material and arranged on opposite sides thereof, said flaps having eyelets formed therein near their ends.

2. An automobile seat cover comprising a rectangular sheet of material having eyelets formed in its corners, a pair of spaced flaps formed on said sheet of material near the center of the cover and extending on opposite sides thereof, said flaps having eyelets formed therein near their ends.

3. An automobile seat cover comprising a rectangular sheet of material having eyelets formed in its corners, a pair of spaced flaps formed on said sheet of material near the center of the cover and extending on opposite sides thereof and fastening means on said flaps.

Des Moines, Iowa, June 26, 1923.

ORVILLE B. OLSON.